(12) United States Patent
Buros

(10) Patent No.: US 8,374,786 B2
(45) Date of Patent: Feb. 12, 2013

(54) GNSS METHOD AND RECEIVER WITH CAMERA AID

(75) Inventor: Julien Buros, Cassina d'Agno (CH)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 12/741,810

(22) PCT Filed: Dec. 11, 2008

(86) PCT No.: PCT/EP2008/067342
§ 371 (c)(1),
(2), (4) Date: May 6, 2010

(87) PCT Pub. No.: WO2009/074654
PCT Pub. Date: Jun. 18, 2009

(65) Prior Publication Data
US 2010/0250133 A1  Sep. 30, 2010

(30) Foreign Application Priority Data
Dec. 11, 2007 (EP) ..................................... 07122843

(51) Int. Cl.
*G01C 21/00* (2006.01)
(52) U.S. Cl. .................. 701/472; 701/408; 701/445
(58) Field of Classification Search ............. 701/408, 701/445, 448, 472
See application file for complete search history.

(56) References Cited

U.S. PATENT DOCUMENTS

| | | | |
|---|---|---|---|
| 6,876,945 B2 | 4/2005 | Emord | |
| 2003/0032436 A1 | 2/2003 | Mikuni | |
| 2006/0146136 A1 | 7/2006 | Cho | |
| 2008/0262718 A1* | 10/2008 | Farwell | 701/207 |
| 2009/0125226 A1* | 5/2009 | Laumeyer et al. | 701/200 |
| 2009/0268033 A1* | 10/2009 | Ukita | 348/169 |
| 2010/0029293 A1* | 2/2010 | Bergh et al. | 455/456.1 |
| 2011/0063432 A1* | 3/2011 | Di Bernardo et al. | 348/116 |

FOREIGN PATENT DOCUMENTS

| | | |
|---|---|---|
| EP | 1762822 A1 | 3/2007 |
| JP | 2001235534 A | 8/2001 |
| JP | 2003111128 A | 4/2003 |
| JP | 2007108029 A | 4/2007 |
| KR | 20060071077 A | 6/2006 |
| WO | WO2006001129 A1 | 1/2006 |

OTHER PUBLICATIONS

International Search Report and Written Opinion—PCT/EP2008/067342, International Search Authority—European Patent Office—May 25, 2009.

\* cited by examiner

*Primary Examiner* — Hussein Elchanti

(57) ABSTRACT

A method of computing navigation information in a portable device comprising a GNSS receiver arranged to receive navigation signals from a plurality of navigation satellites, and a GNSS processor to extract a GNSS position information from said navigation signals. The GNSS receiver is also arranged to obtain image data from a camera module. The method comprises the steps of: deriving a set of position information from the camera module; providing the camera-derived position information to a navigation processor; using said set of camera-derived position information and said navigation signals, to generate a position fix of the GNSS receiver; computing navigation information based on said generated position fix.

24 Claims, 2 Drawing Sheets

GNSS METHOD AND RECEIVER WITH CAMERA AID

FIELD OF THE INVENTION

The present invention relates to a portable signal radiolocalization receiver integrated into another host system, like for example a general-purpose computer, PDA or cell phone, which uses data provided by a camera in order to help the localization process.

DESCRIPTION OF RELATED ART

The global navigation satellite systems (GNSS), such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

As opposed to the GNSS radiolocalization system, inertial navigation systems (INS) have been developed in order to provide positioning information in a standalone manner, based on embedded sensor information which allow to derive speed direction and speed. INS systems typically include dedicated inertial measurement units (IMUs) such as accelerometers and gyroscopes. Usually, INS systems are able to provide more reliable positioning information but are also quite expensive and require a high processing power.

The following description relates mostly to the GPS Global Positioning System as GNSS system. The invention is not however limited to this particular system but can also be employed in receivers for radiolocalization systems based on the same principles, for example the GLONASS system or the GALILEO system, and can be extended to other future radiolocalization systems to which the invention is applicable.

In the case of the original GPS radiolocalization system, each of the operational GPS satellites, also indicated as Space Vehicle or SV, transmits a navigational radio signal at two carrier frequencies, referenced as "L1" and "L2" and situated at 1572.42 MHz and 1227.60 MHz respectively. The L1 and L2 carriers are modulated by two digital ranging code sequences, called the C/A (coarse acquisition) code and the P(Y) code, the latter being mostly restricted to the US government and military.

The C/A code, which is used by commercial GPS receiver, is modulated in the L1 and in the L2 carriers. C/A codes, which are unique for each GPS satellite, are pseudo-random Gold codes comprising a repetition of a 1023 bits, or "chips", with a transition rate of 1.023 MHz, and are often indicated in short as PRN. The C/A code thus repeats itself every millisecond. The ranging code sequences are synchronized to a common precise time reference, the "GPS time" which is held by precise clocks on board of each satellite, and which are synchronized to a master clock. The effect of the PSK modulation with the C/A code is to spread the spectrum of the modulated signal over a 1 MHz bandwidth.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise.

In order to acquire these codes and perform a position fix a GPS receiver generates, for each received satellite, a local replica of the C/A code, the PRN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The phase in which the GPS receiver endeavors to localize a sufficient number of satellite signals in the phase offset—Doppler shift space with little or no knowledge of their position is usually named the "acquisition" state. Once the peaks are found, their Doppler frequency and phase offset change constantly, because of the motion of the space vehicles and the receiver. In the "tracking" state, the system must follow the drift, of the correlation peaks, in order to provide valid position fixes.

One issue that arises with GPS and other GNSS systems is that the signal strength, which is typically of −130 dBmW for the GPS signals on earth surface is, nominally, becomes too weak when further attenuated whenever the view of the sky is obstructed, and especially within buildings. The levels reached are well below the noise floor, thus the signal can be received only by use of statistical techniques and require hence more processing power. In the zones where the GPS signal reception quality is bad and accordingly the signal-to-noise ratio (SNR) too high, a.k.a. urban canyons, the GPS signals can be lost.

In order to overcome this issue, seamless navigation systems have been proposed in order to cope with the GPS signals temporary unavailability.

The international patent application WO2004/070 discloses a navigation solution based on a tight GPS/INS integration, in which a Kalman filter processes data from the relative sensor system (e.g. an inertial measurement unit or IMU) and the GPS, which have previously been synchronized through a common clock unit. This solution provides indeed a better accuracy and resiliency for the navigation, but on the other hand it inherently implies substantial hardware overhead for the synchronization and requires significant processing power. This solution is thus not suited for small portable devices with limited processing power and space.

The U.S. Pat. No. 6,876,945 provides another example of an integrated INS/GPS system, in which a coupling between an inertial measurement unit (IMU) and an ultrasonic Doppler velocity measurement sensor (UVM) provides improved seamless navigation capabilities when GPS signals are not available. The UVM is meant to aid the IMU during GPS signal deprivation in order to keep up with the accuracy level of the integrated navigation system. This solution does not use yet any visual means as a back-up data supplier for GPS aiding.

There is therefore a need to provide a navigation system and method overcoming the above mentioned problems of the prior art in terms of efficiency and using visual means.

BRIEF SUMMARY OF THE INVENTION

It is an aim of the present invention to provide a better resiliency for a navigation method and system making the best use of the available resources.

It is another aim of the present invention to provide a navigation method and system using position data derived from a camera.

According to the invention, these aims are achieved by means of a method of computing navigation information in a portable device which comprises a GNSS receiver arranged to receive navigation signals from a plurality of navigation satellites, and comprises a GNSS processor to extract a GNSS position information from said navigation signals. The GNSS receiver is also arranged to obtain image data from a camera module. The method comprises the steps of:

deriving a set of position information from the camera module;

providing the camera-derived position information to a navigation processor;

using said set of camera-derived position information and said navigation signals, to generate a position fix of the GNSS receiver;

computing navigation information based on said generated position fix.

These aims are also achieved by a device for camera-assisted GNSS navigation, comprising a camera module and a GNSS module which are connected through an interface to a navigation backup module used by a navigation software.

The device and method according to the invention provide a seamless navigation system provided with a backup position information supplier when GPS signals are weak or not available, with limited requirements in terms of processing power. They can be easily integrated and used in existing portable devices provided with cameras, like new generation mobile phones.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
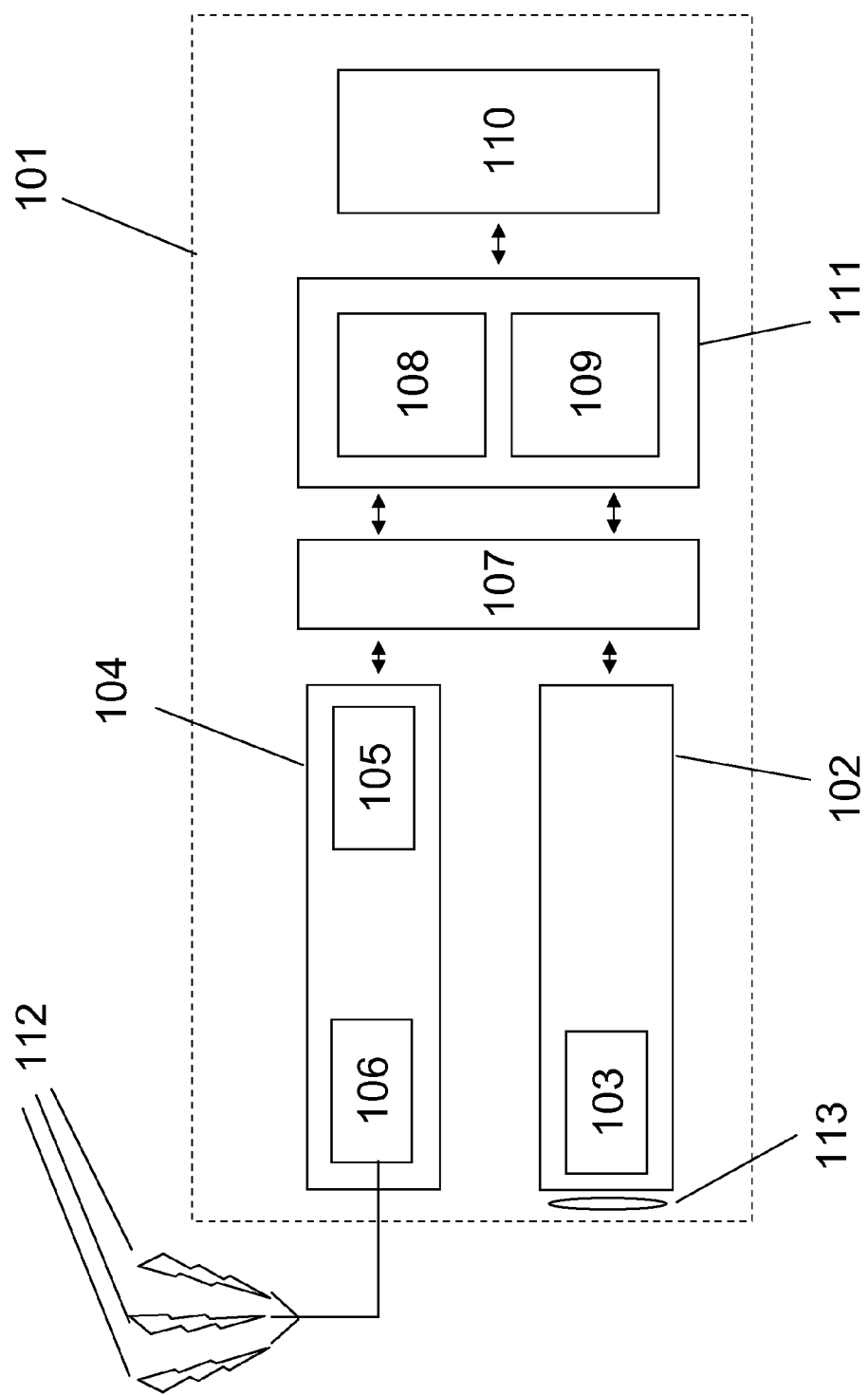
FIG. 1 shows a logical view of a system comprising a GNSS, camera, and complementary navigation modules according to the invention.

The present invention refers to a navigation system and a related navigation method running on a portable device or host system 101 as described on FIG. 1. The host system 101 contains a GNSS receiver 104, preferably a GPS receiver 104 integrating an RF front-end 106 receiving navigation signals 112 sent by satellites, and a GNSS processor 105. The GNSS receiver 104 can be a module in a cellular phone, a PDA (Portable Digital Assistant) and so forth; however it can also consist in a pluggable module, which may be connected to the hosting device 101 by means of an appropriate bus, for example a GPS PC-card.

According to the preferred embodiment illustrated on FIG. 1, the "GPS receiver" 104 is coupled to a camera module 102 of the host system through a communication interface 107. The camera module 102 is depicted with its lens 113; it also contains a sensor 103, for example a CCD image sensor or a CMOS image sensor.

The interface 107 is not only meant for the connection between the camera module 102 and the GNSS receiver module 104; it also connects both modules 102,104 to a so-called navigation backup module 111. The navigation back-up module 111 according to the invention is a module which assists in the navigation process of a navigation software 110 thanks to other sources of localization input than the regular satellite navigation signals 112, when they fail to provide a suitable and reliable positioning. The navigation backup module preferably contains a sensor manager unit 108, e.g. monitoring the signal strength of satellite signals, and also a mapping module 109, in charge of processing the sensor data output and deriving position information.

According to the invention, the source of input used apart from satellite signals 112 are image data provided by the camera module 103. The image data output is processed primarily in order to know whether portable device 101 containing the GNSS receiver 104 is currently moving or standing still. A set of position information can for example be derived from a sequence of images recorded by the camera module, which allows then to estimate a motion speed based on those sequence of images. Although this step of deriving position information is supposedly carried out by the so-called mapping module 109, there is no restriction on the physical location where the image data processing algorithm is run and it is also conceivable that this algorithm may be run on an hardware embedded in the camera module 102, meaning that the mapping module 109 would in this case be physically included in the camera module. The embodiment illustrated on FIG. 1 should therefore not be considered as limitative from an hardware implementation perspective, its purpose being mainly to show a logical segmentation between the functions and modules.

Another option to derive position information from images output can also be to use landmark features. When landmarks are recognized on an image, e.g. thanks to an image processing algorithm extracting the required feature, the extracted landmark feature can allow to retrieve a precise position insofar as this feature has already been associated with precise location or geographical coordinates, for example because the landmark had previously been recognized and associated with a GPS-determined position fix. In this case, the step of deriving position information can simply consist in mapping an extracted feature with a set of known locations stored in a memory of the device 101, possibly directly in the camera module 102. The step of mapping a landmark with position coordinates can be done offline for the sake of efficiency.

The landmark feature recognition is possibly performed only when the GPS receiver 104 is turned on, whereas the landmark feature can be included in an image that has been taken by the camera as the GPS receiver 104 was turned off for the sake of power saving purposes.

The step of deriving a set of position information such as motion speed, direction, is to provide a similar kind of aiding as for gyroscope and accelerometers or any inertial measurement unit. The proposed aiding solution may not attain the precision provided by inertial sensors; however it makes efficient use of the existing resource and does not require extra hardware, especially when the device hosting the receiver already includes an image sensor, as it is often the case. The aiding based on image is also functionally easy to use, the only requirement being that the device 101 hosting the camera is not placed in a pocket or any place where it cannot take image snapshots.

The set of position information that have been derived from the camera module 102 are fed to a navigation processor, which may be the GNSS processor 105, e.g. a DSP, of the GNSS receiver 104, but not necessarily. In a variant embodiment, it could for example be a processor of a host system 101 connected to both camera and GNSS modules 102,104 through a common bus. The navigation processor uses both the set of camera-derived information and navigation signals 112 in order to compute a position fix or location coordinates of the GNSS receiver 104. The two available sets of information used for the localization process provides information redundancy, which gives a maximal flexibility to enhance the reliability and resiliency of the system, e.g. in case GNSS navigation signals 112 are only intermittently available. The camera derived set of position information can be used thus both as a backup and as a complement.

Figure 2:
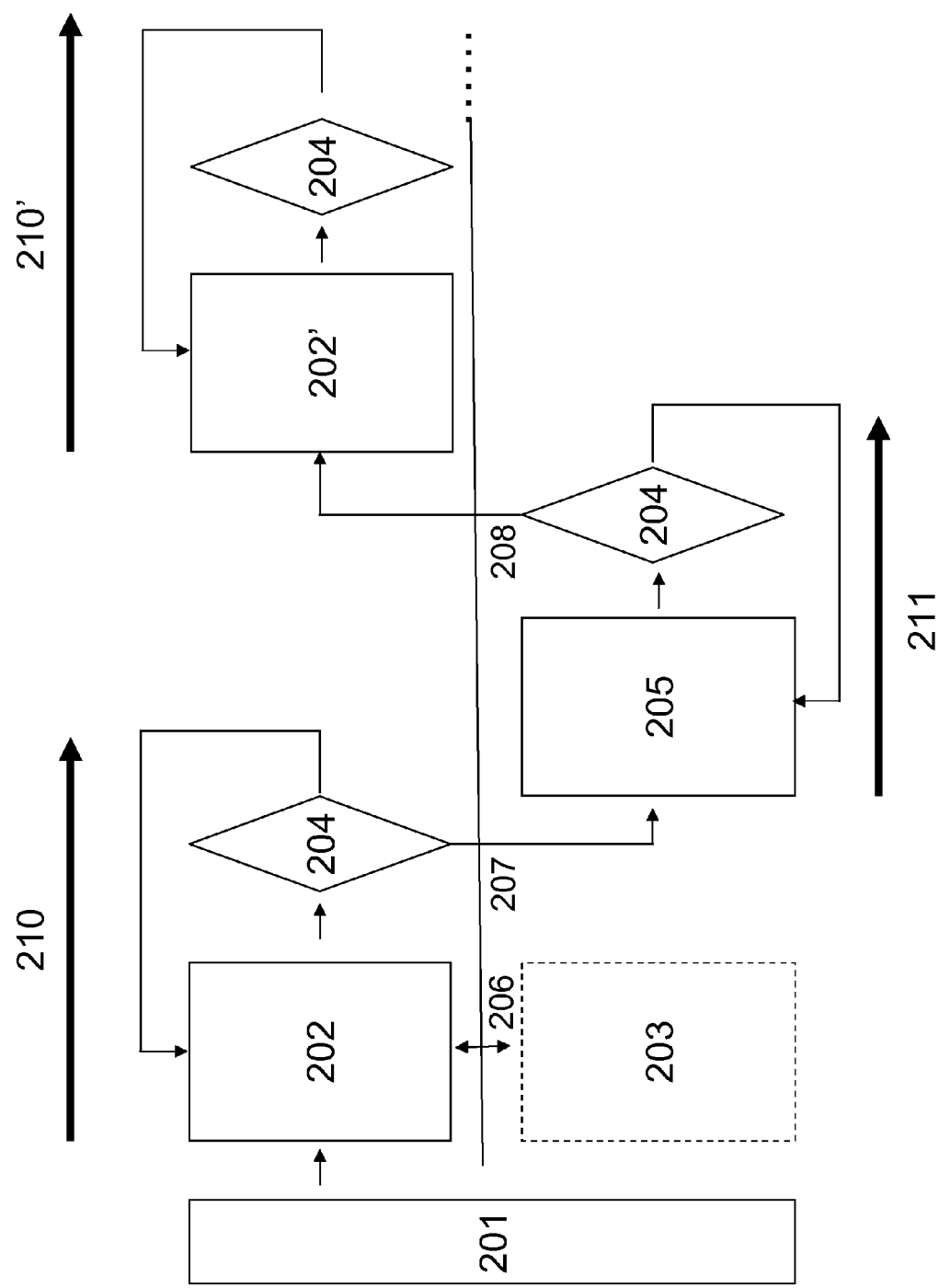
FIG. 2 shows a state diagram with the regular and camera assisted navigation phases according to the invention.

FIG. 2 shows a state diagram illustrating a preferred embodiment of the method according to the invention, highlighting its resiliency. Once the navigation is started (step 201), the GNSS receiver 104 enters a signal acquisition mode (step 202). During this step, the camera can be calibrated (step 203), either in a standalone mode, e.g. using the landmarks previously mentioned. It is also possible to perform the calibration step 203 based on satellite-based position information derived from satellites navigation signals 112. The coupling 206 between the GNSS receiver 104 and the camera module 102 allows to process the camera-derived information in view of computed GNSS based position fixes, and perform the required mapping and adjustment.

The coupling 206 pattern for the calibration is preferably loose, in the sense that position coordinates can be computed independently during this phase. According the preferred embodiment illustrated on FIG. 2, the GNSS set of localization information prevail over the camera derived information, so that the calibration step 203 is dashed in order to show that the camera navigation assistance is in a passive mode. It is however also possible to consider that the camera module 102 and the GNSS receiver are coupled according to a tight pattern and can perform mutual calibration in order to enhance the results accuracy, in selectively adjusting localization positions fixes according to the most accurate and reliable information provided by either of the modules 102,104. The image-based aid can hence so be used to crosscheck position derived from the satellite signals.

According to the diagram of FIG. 2, the navigation process starts in a mode 210 where the localization process is carried out with the use of GNSS signals only (step 202). The step 204 corresponds to a selective activation of camera-derived position information use in the navigation processor. This activation can be done when the reception of said navigation signals 112 from said plurality of navigation satellites is poor or absent, whereby a threshold can be determined in advance, e.g. a certain level of SNR ratio. The activation can be triggered e.g. by the sensor management module 108, which executes a switch in the navigation mode (step 207) and starts a phase 211 where camera derived position information are actively used by the navigation processor.

In this mode 211, the camera aided navigation can enter a dead-reckoning mode (not illustrated) when no more satellite signals 112 are available. The dead reckoning mode needs though to be acknowledged upon consistency of the motion of the GNSS receiver 104 that needs to remain uniform. The step 205 of deriving a set of position information from the camera module 102 can thus comprise power management features with a sleeping mode loop for the dead reckoning mode. The camera module 102 remains in the sleeping mode as long as no change in speed or direction is detected. The activation e.g. by the sensor management module 108 require more processing, e.g. from the mapping module 109, for deriving position information while following the path of the GNSS receiver 104. This dead-reckoning back-up navigation feature according to the invention can be quite useful in the case of pedestrian motion, or for indoor use where the signal reception is generally worse than outdoors. The indication that a position has not changed when the camera module 102 recognizes the same surroundings of e.g. a room, is useful piece of information for helping the GNSS navigation process when restarting a new signal acquisition phase, as explained in the next paragraph.

The camera aided mode can be desactivated, e.g. when a sufficient number of satellite signals is acquired and reliably tracked. The checking step before switching back is illustrated as the same as the selective activation step 204 used before based on satellite signal 112 quality tracking. After the navigation mode has been switched back (step 208) to a GNSS regular mode, another phase 210' start where only satellite navigation signals 112 are used. For this new phase 210' the camera aided phase 211 will have allowed to restrict the search space for the new acquisition of the satellite signals 112 (step 202') based on the set of camera-derived position information, and therefore provided an assistance in the search process that will shorten both the acquisition time and the processing power required in order to do so. Although this gain in acquisition time has been highlighted after a dead-reckoning step or simply camera-aided step, it will be appreciated that this kind of help could also be provided since the very start 201 of the navigation process, and more specifically not necessarily after a mode switch 207,208.

It will also be appreciated that the arrows 210, 210', 211 correspond to time sequences of navigation modes where the camera aid is actively used or not; the feedback loops indicate only a locking in each phase respectively.

The method and navigation system disclosed are meant for an easy integration in common any portable devices provided with cameras, like new generation mobile phones equipped with GPS receivers. The example illustrated for the hardware implementation should yet not be considered as restrictive in terms of architecture options. The man skilled in the art will easily understand that the interface 107, modules 108, 109 and processors 105 shall not be interpreted with any limitation in terms of circuitry options, as well as standards and communication protocols supported. It is also conceivable to think of a solution in which most of the modules required to perform the navigation method software based rather than hardware based, so that the collaboration with the navigation software is made easier.

In particular, it would be advantageous to provide a software module whose launch would perform the step 205 of deriving position information from the camera module 102 as well as any step involved in the camera-aided navigation process and mentioned earlier in this document, including the position fix generation of the GNSS receiver 104 and the computation of navigation information. Such a module could be supplied e.g. as an add-on to a navigation software 111 delivered with a GPS module.

The present invention, is not limited to the foregoing examples, but allows several variants and embodiments, within the scope of the appended claims. The camera could be used, for example, to detect movements from recognition of road patterns, for example for detecting a change of lane by recognizing the position of the white line. Neither is the invention limited to the case of a single camera, or of a single lens imaging system. The method of the invention includes also the case in which a stereo imaging system is used.

According to another variant of the invention, the position information derived from the camera module does not require the formation of an image. In driving, for example, the camera my detect a sudden variation of ambient light, and infer that the vehicle has entered or exited a tunnel.

This camera-derived position information can be used to improve the position fix and compute navigation information.

REFERENCE LIST

| References List | |
|---|---|
| 101 | Host system |
| 102 | Camera module |
| 103 | Camera sensor (e.g. CCD) |
| 104 | GNSS receiver module |
| 105 | GNSS processor |
| 106 | RF front end |
| 107 | Interface |
| 108 | Sensor manager module |
| 109 | Mapping module (in charge of the calibration also) |
| 110 | Navigation software |
| 111 | Navigation assistance module |
| 112 | Satellite navigation signals |
| 113 | Camera lens |
| 201 | Navigation start |
| 202 | GPS signal acquisition step |
| 203 | Camera calibration (see if power mgmt feature/sleeping etc) Dashed because passive |
| 204 | GPS signal tracking step |
| 205 | Step of deriving a set of position information from the camera |
| 206 | Coupling between camera and GPS module |
| 207 | Switch to camera aided mode |
| 208 | Switch back to GPS navigation mode |
| 210 | GPS only navigation mode phase |
| 211 | Camera aided mode phase |

The invention claimed is:

1. A method of computing navigation information in a portable device, the device comprising a GNSS receiver, wherein the GNSS receiver is arranged to receive navigation signals from a plurality of navigation satellites, and comprises a GNSS processor, to extract a GNSS position information from the navigation signals, the GNSS receiver being further arranged to obtain data from a camera module, the method comprising the steps of:
deriving a set of position information using the camera module, by estimating a motion of the device from a sequence of images, the sequence of images recorded by the camera module using a lens;
providing the set of camera-derived position information to a navigation processor;
using the set of camera-derived position information and the navigation signals, to generate a position fix of the GNSS receiver, wherein a dead-reckoning position estimation mode is acknowledged upon consistency of the set of camera-derived position information with a uniform motion of the GNSS receiver; and
computing navigation information based on the generated position fix.

2. The method of claim 1, further comprising a step of restricting a search space for the acquisition of the navigation signals received from the plurality of navigation satellites based on the set of camera-derived position information.

3. The method of claim 1, wherein the use of the set of camera-derived position information in the navigation processor is selectively activated when the reception of the navigation signals from the plurality of navigation satellites is poor or absent.

4. The method of claim 1, further comprising a step of recognizing a landmark feature in the image data from the camera module, wherein the step of deriving the set of camera-derived position information from the camera module consists in retrieving previously known position of the landmark feature.

5. The method of claim 4, wherein the step of recognizing a landmark feature is only performed when the GNSS receiver is turned on, the landmark feature being included in a previous image taken by the camera module while the GNSS receiver is turned off.

6. The method of claim 1, wherein the step of deriving the set of position information from the camera module includes power management features.

7. The method of claim 1, further comprising a step of calibration of the set of camera-derived position information.

8. The method of claim 7, wherein the step of calibration is performed through coupling to satellite-based position information derived from the navigation signals received from the plurality of navigation satellites.

9. A device for camera-assisted GNSS navigation, comprising a camera module and a GNSS module which are connected through an interface to a navigation backup module used by a navigation software, wherein:
the GNSS module is configured to receive navigation signals from a plurality of navigation satellites and extract a GNSS position from the navigation signals;
the camera module is configured to derive a set of position information, by estimating a motion of the device from a sequence of images, the sequence of images recorded by the camera module using a lens;
the navigation processor connected to the interface is configured to receive the set of camera-derived position information and use the set of camera-derived position information and the navigation signals, to generate a position fix of the GNSS, wherein the device is configured to acknowledge a dead-reckoning position estimation mode by analyzing the set of camera-derived position information with a uniform motion of the GNSS module; and
the device is configured to compute navigation information based on the generated position fix.

10. The device of claim 9, wherein the navigation backup module further comprising a sensor management module for managing sensors of the camera module and the GNSS module.

11. The device of claim 10, wherein navigation processor is a GNSS processor.

12. The device of claim 10, wherein the navigation backup module further comprising a mapping module for processing the sensor management module data output and deriving position information.

13. The device of claim 9, wherein the navigation software is configured to restrict a search space for the acquisition of the navigation signals received from the plurality of navigation satellites based on the set of camera-derived position information.

14. The device of claim 9, wherein the navigation backup module is configured to selectively activate the use of the set of camera-derived position information when the reception of the navigation signals from the plurality of navigation satellites is poor or absent.

15. The device of claim 9, wherein said navigation backup module is configured to recognize a landmark feature in the image data from the camera module, wherein the set of camera-derived position information consists of retrieving previously known position of the landmark feature.

16. The device of claim 15, wherein the recognition of the landmark feature is only performed when the GNSS module is turned on, and wherein the retrieval of the previously known position of the landmark feature occurs when the GNSS module is turned off.

17. The device of claim 9, wherein the navigation backup module is configured to include power management features when the device is in the dead-reckoning position estimation mode.

18. The device of claim 9, wherein the GNSS module is configured to calibrate the set of camera-derived position information based on the navigation signals received from the plurality of navigation satellites.

19. A computer-program product for enabling a computer to determine navigation information, the computer-program product comprising:
    software instructions for enabling the computer to perform predetermined operations; and
    a non-transitory computer readable storage medium bearing the software instructions;
    the predetermined operations including:
    receiving navigation signals from a plurality of navigation satellites;
    extract a GNSS position information from the navigation signals;
    deriving a set of position information using a camera module by estimating a motion of the camera module from a sequence of images, the sequence of images recorded by the camera module using a lens;
    providing the set of camera-derived position information to a navigation processor;
    using the set of camera-derived position information and the navigation signals to generate a position fix of the camera module, wherein a dead-reckoning position estimation mode is acknowledged upon consistency of the set of camera-derived position information with a uniform motion of the GNSS receiver; and
    computing navigation information based on the generated position fix.

20. The computer program product of claim 19, wherein the predetermined operations further includes restricting a search space for acquisition of the navigation signals received from the plurality of navigation satellites based on the set of camera-derived position information.

21. The computer program product of claim 19, wherein the predetermined operations further includes selectively activating the use of the set of camera-derived position information when the reception of the navigation signals from the plurality of navigation satellites is poor or absent.

22. The computer program product of claim 19, wherein the predetermined operations further includes recognizing a landmark feature in the image data from the camera module, wherein the deriving the set of camera-derived position information from the camera module consists in retrieving previously known position of the landmark features.

23. The computer program product of claim 19, wherein the predetermined operations further includes managing power features of the device.

24. The computer program product of claim 19, wherein the predetermined operations further includes calibrating the set of camera-derived position information based on the navigation signals received from the plurality of navigation satellites.

* * * * *